US012563361B2

(12) United States Patent (10) Patent No.: US 12,563,361 B2
Park et al. (45) Date of Patent: Feb. 24, 2026

(54) SYSTEM AND METHOD FOR INTELLIGENT INDUSTRIAL SAFETY MONITORING

(71) Applicant: ELECTRONICS AND TELECOMMUNICATIONS RESEARCH INSTITUTE, Daejeon (KR)

(72) Inventors: Cheonshu Park, Daejeon (KR); Kye Kyung Kim, Daejeon (KR); Sang Seung Kang, Daejeon (KR); Moonki Back, Daejeon (KR); JaeMin Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 506 days.

(21) Appl. No.: 18/090,393

(22) Filed: Dec. 28, 2022

(65) Prior Publication Data

US 2024/0171935 A1 May 23, 2024

Related U.S. Application Data

(60) Provisional application No. 63/428,624, filed on Nov. 29, 2022.

(30) Foreign Application Priority Data

Nov. 22, 2022 (KR) .......................... 10-2022-0157033

(51) Int. Cl.
*H04W 4/021* (2018.01)
*E02F 9/24* (2006.01)
(Continued)

(52) U.S. Cl.
CPC ............... *H04W 4/021* (2013.01); *E02F 9/24* (2013.01); *E02F 9/261* (2013.01); *G06Q 10/0635* (2013.01); *H04W 4/029* (2018.02)

(58) Field of Classification Search
CPC ......... H04W 4/021; H04W 4/029; E02F 9/24; E02F 9/261; G06Q 10/0635
See application file for complete search history.

(56) References Cited

U.S. PATENT DOCUMENTS 9,467,806 B2 * 10/2016 Omar ..................... H04W 4/029
11,803,955 B1 * 10/2023 Pandya ................ G08B 29/186
(Continued)

FOREIGN PATENT DOCUMENTS

KR 20210094766 A 7/2021

*Primary Examiner* — Dylan C White
(74) *Attorney, Agent, or Firm* — Rabin & Berdo, P.C.

(57) ABSTRACT

There is provided a system for intelligent industrial safety monitoring. The system includes a global monitoring unit configured to generate first monitoring information by globally monitoring a work area of an industrial site, a local monitoring unit attached to a work object at work within the work area and configured to generate second monitoring information by monitoring a surrounding area of the work object, a communication unit configured to transmit and receive data to and from the global monitoring unit and the local monitoring unit, and a first controller configured to generate information on a location of the work object based on the first monitoring information and track a moving path of the work object and at least one second controller configured to predict an at-risk object that has approached within a predetermined distance of the work object based on the second monitoring information.

9 Claims, 10 Drawing Sheets

(51) Int. Cl.
  *E02F 9/26*          (2006.01)
  *G06Q 10/0635*      (2023.01)
  *H04W 4/029*        (2018.01)

(56)                References Cited

U.S. PATENT DOCUMENTS 12,033,751  B2 *    7/2024   Leong ................... G16H 40/63
    12,241,233  B2 *    3/2025   Ogawa .................. E02F 9/261
2014/0158468  A1 *    6/2014   Adami ................ B60Q 1/0035
                                                      187/222
2019/0236370  A1 *    8/2019   Man ................. G06Q 10/0633
2021/0012448  A1 *    1/2021   Barak ................. G06Q 50/265
2022/0012655  A1 *    1/2022   Barak ....................... F16P 3/14
2022/0019949  A1 *    1/2022   Shobu ................... G06Q 50/04
2022/0032926  A1 *    2/2022   Mell ..................... B60Q 9/008
2024/0185717  A1 *    6/2024   Wendt .................... B62J 11/04
2024/0355207  A1 *   10/2024   Reed ............... G08G 1/096775

* cited by examiner

Figures 1, 2:
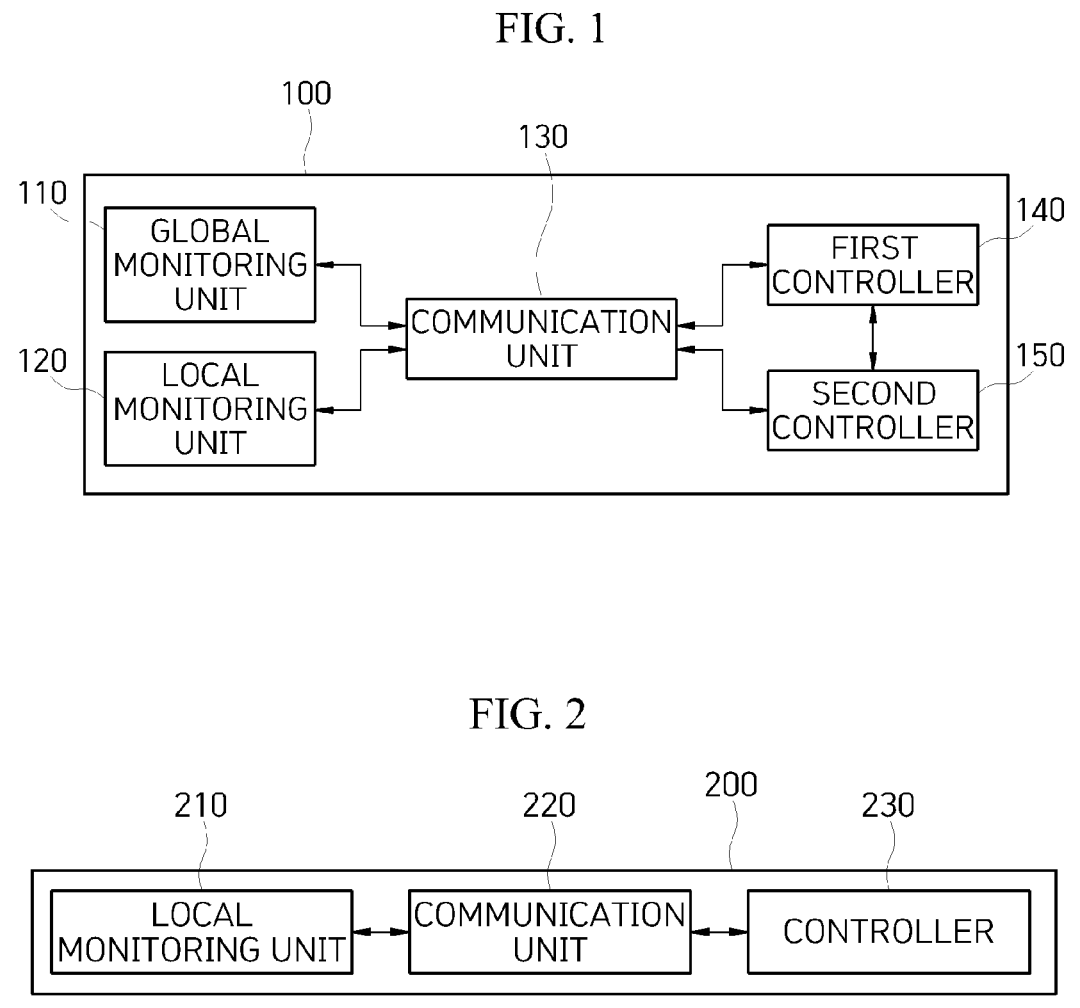

| GLOBAL MONITORING UNIT |
| --- |

| LOCAL MONITORING UNIT |
| --- |

| COMMUNICATION UNIT |
| --- |

| FIRST CONTROLLER |
| --- |

| SECOND CONTROLLER |
| --- |

| LOCAL MONITORING UNIT |
| --- |

| COMMUNICATION UNIT |
| --- |

| CONTROLLER |
| --- |

701 LEARNING MODEL FOR DETECTING OBJECT WITHIN DANGER AREA

QUANTIZATION

702 TF LTE MODEL

COMPILE

703 EMBEDDED (TPU) MODEL

OPTIMIZE

704 OPTIMIZE EMBEDDED INFERENCE MODEL

DEPLOY

705 MOUNT EMBEDDED TPU TERMINAL

810 — EMBEDDED TERMINAL

APPLY TO INDUSTRIAL SITE

MOUNT MOVING OBJECT DETECTION MODEL ON EMBEDDED BOARD

820

APPLY SITE FEEDBACK LEARNING MODEL

LEARNING MODEL FOR DETECTING OBJECT WITHIN DANGER AREA

CONVERT

TF LITE MODEL

COMPILE

EMBEDDED (TPU) MODEL

OPTIMIZE

OPTIMIZE EMBEDDED INFERENCE MODEL

DEPLOY

MOUNT EMBEDDED TPU TERMINAL

FIG. 9

FACE       UPPER BODY       LOWER BODY 1010        1020        1030        1040        1050

ESTIMATE WHOLE BODY

IOU COMPARISON

RESULTS OF ESTIMATION OF WHOLE BODY 1110        1150        1100        1130

| INPUT UNIT | PROCESSOR | DISPLAY UNIT |
|---|---|---|
| COMMUNICATION UNIT | | MEMORY |

1120        1140

SYSTEM AND METHOD FOR INTELLIGENT INDUSTRIAL SAFETY MONITORING

CROSS-REFERENCE TO RELATED APPLICATION

This application claims priority to and the benefit of Korean Patent Application No. 10-2022-0157033, filed on Nov. 22, 2022, and U.S. Patent Application No. 63/428,624, filed on Nov. 29, 2022, the disclosure of which is incorporated herein by reference in its entirety.

BACKGROUND

1. Technical Field

The present disclosure relates to a system and method for intelligent industrial safety monitoring.

2. Related Art

A safety accident in an industrial site occurs due to various causes, such as an obstacle, a worker's careless behavior, a hidden object, an unexpected situation, a worker's bad habit, a failure to comply with safety rules, a worker's health disorder, and limitations in securing visibility in a blind spot.

A conventional technology for preventing a danger of an accident by monitoring a dangerous situation around a specific danger area has limits in that it is difficult to predict a dangerous situation if a worker deviates from a monitoring area or a sensor capable of detecting a dangerous situation is not present.

Furthermore, a conventional safety monitoring technology applies a model that has learnt an open dataset or a specific industrial environment. Accordingly, there is a problem in that a case occurs in which detection performance of a dangerous situation is reduced or a dangerous situation is not detected because characteristics of an industrial site having a different working environment are not incorporated. Furthermore, there are limitation to the sensing of a dangerous situation because a risk factor is different depending on different driving equipment and a different working environment in each industrial site.

SUMMARY

Various embodiments are directed to a system and method for intelligent industrial safety monitoring, which can detect a risk factor which may occur by globally monitoring a work area of an industrial site and can predict an at-risk object by locally monitoring the surroundings of a work object at work.

However, an object to be solved by the present disclosure is not limited to the aforementioned object, and other objects may be present.

According to a first aspect of the present disclosure, a system for intelligent industrial safety monitoring includes a global monitoring unit configured to generate first monitoring information by globally monitoring a work area of an industrial site, a local monitoring unit attached to a work object at work within the work area and configured to generate second monitoring information by monitoring a surrounding area of the work object, a communication unit configured to transmit and receive data to and from the global monitoring unit and the local monitoring unit, and a first controller configured to generate information on a location of the work object based on the first monitoring information and track a moving path of the work object and at least one second controller configured to predict an at-risk object that has approached within a predetermined distance of the work object based on the second monitoring information.

Furthermore, according to a second aspect of the present disclosure, a system for intelligent industrial safety local monitoring includes a local monitoring unit attached to a work object at work within a work area of an industrial site and configured to generate monitoring information by monitoring a surrounding area of the work object, a communication unit configured to transmit and receive data to and from the local monitoring unit, and at least one controller configured to predict an at-risk object that has approached within a predetermined distance of the work object based on the monitoring information.

Furthermore, according to a third aspect of the present disclosure, a method for intelligent industrial safety monitoring includes generating first monitoring information by globally monitoring a work area of an industrial site, being attached to a work object at work within the work area and generating second monitoring information by monitoring a surrounding area of the work object, generating information on a location of the work object based on the first monitoring information and tracking a moving path of the work object, and predicting an at-risk object that has approached within a predetermined distance of the work object based on the second monitoring information.

A computer program according to another aspect of the present disclosure executes the method for intelligent industrial safety monitoring and is stored in a computer-readable recording medium.

Other details of the present disclosure are included in the detailed description and the drawings.

According to an embodiment of the present disclosure, a dangerous situation can be detected and real-time notification can be provided by globally and locally monitoring a dangerous situation which may occur in various industrial sites.

Accordingly, there are advantages in that an industrial disaster can be prevented by predicting an accident, such as a collision, an entrapment, constriction, or a fall, which occurs in indoor and outdoor working environments of an industrial site in advance and that a rapid reaction can be taken through the analysis and prediction of an accident which may occur.

The effects of the present disclosure are not limited to the aforementioned effects, and other effects which are not mentioned herein will be clearly understood by those skilled in the art from the following descriptions.

BRIEF DESCRIPTION OF THE DRAWINGS

FIG. 1 is a block diagram of a system for intelligent industrial safety monitoring according to an embodiment of the present disclosure.

FIG. 2 is a block diagram of a system for intelligent industrial safety local monitoring according to an embodiment of the present disclosure.

FIG. 9 is a diagram for describing contents in which a whole body estimation ratio is learnt in an embodiment of the present disclosure.

DETAILED DESCRIPTION

Figure 3:
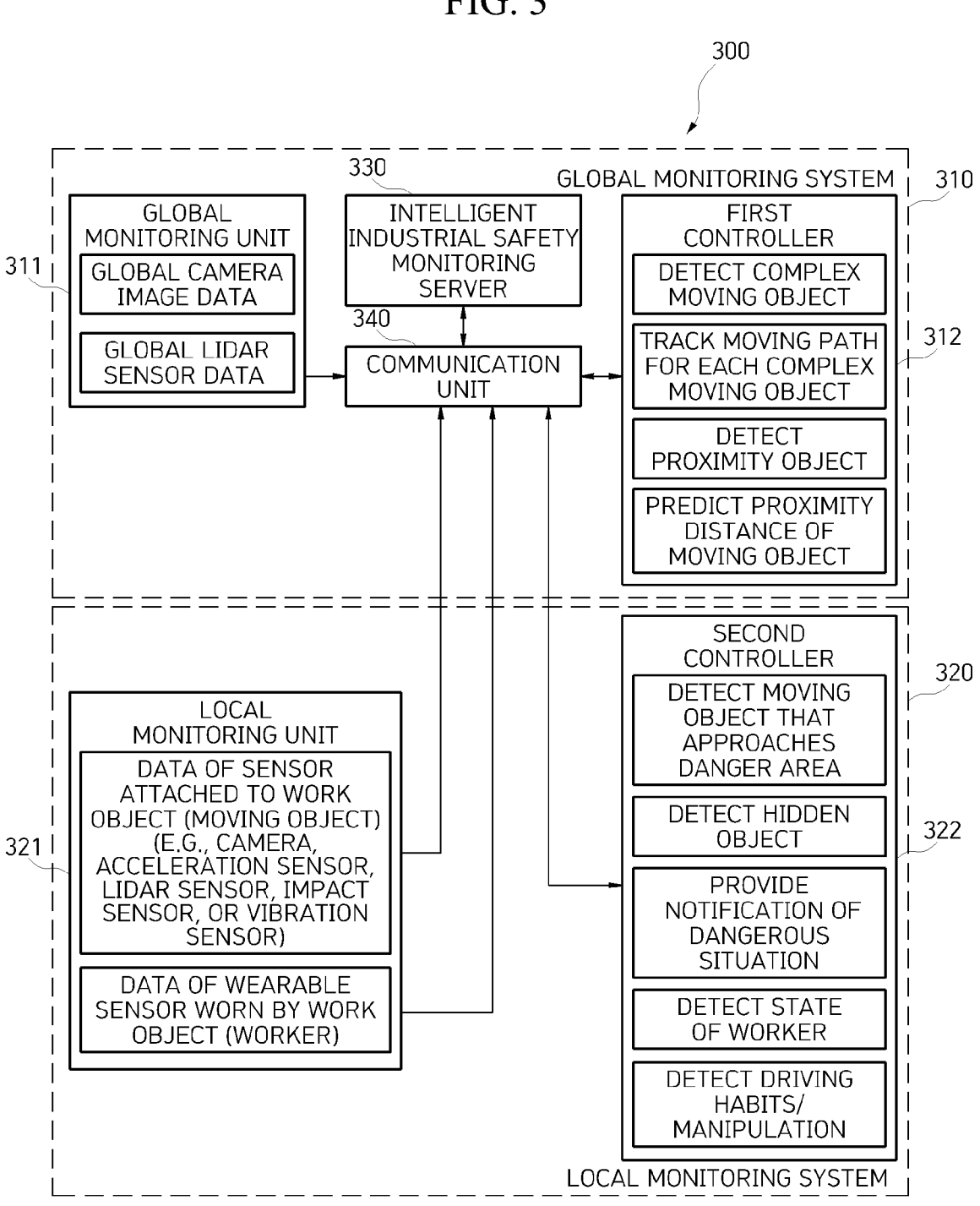
FIG. 3 is a diagram illustrating a detailed structure of the system for intelligent industrial safety monitoring illustrated in FIGS. 1 and 2.

Advantages and characteristics of the present disclosure and a method for achieving the advantages and characteristics will become apparent from the embodiments described in detail later in conjunction with the accompanying drawings. However, the present disclosure is not limited to the disclosed embodiments, but may be implemented in various different forms. The embodiments are merely provided to complete the present disclosure and to fully notify a person having ordinary knowledge in the art to which the present disclosure pertains of the category of the present disclosure. The present disclosure is merely defined by the category of the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other elements in addition to a mentioned element. Throughout the specification, the same reference numerals denote the same elements. The term "and/or" includes each of mentioned elements and all combinations of one or more of mentioned elements. Although the terms "first", "second", etc. are used to describe various components, these elements are not limited by these terms. These terms are merely used to distinguish between one element and another element. Accordingly, a first element mentioned hereinafter may be a second element within the technical spirit of the present disclosure.

All terms (including technical and scientific terms) used in this specification, unless defined otherwise, will be used as meanings which may be understood in common by a person having ordinary knowledge in the art to which the present disclosure pertains. Furthermore, terms defined in commonly used dictionaries are not construed as being ideal or excessively formal unless specially defined otherwise.

The present disclosure relates to a system and method for intelligent industrial safety monitoring.

According to an embodiment of the present disclosure, a dangerous situation can be monitored and handled by checking a risk factor which may occur in a complicated working environment of an industrial site, such as manufacturing, logistics, distribution, a construction, ship building, or a port, detecting and tracking a work object through global monitoring, detecting a dangerous situation which is changed in real time through local monitoring, and providing warning notification.

Hereinafter, a system 100 for intelligent industrial safety monitoring and a system 200 for intelligent industrial safety local monitoring according to embodiments of the present disclosure are described with reference to FIGS. 1 to 10.

FIG. 1 is a block diagram of the system 100 for intelligent industrial safety monitoring according to an embodiment of the present disclosure.

The system 100 for intelligent industrial safety monitoring according to an embodiment of the present disclosure includes a global monitoring unit 110, a local monitoring unit 120, a communication unit 130, and first and second controllers 140 and 150.

The global monitoring unit 110 generates first monitoring information by globally monitoring a work area of an industrial site. As an embodiment, the global monitoring unit 110 may be a camera, or a LiDar sensor.

The local monitoring unit 120 is attached to a work object at work within a work area, and generates second monitoring information by monitoring a surrounding area of the work object. As an embodiment, the local monitoring unit 120 may be a camera or various sensors (e.g., proximity/distance/impact/vibration sensors and a LiDar sensor) that are attached to the work object.

A danger which cannot be detected through the local monitoring unit 120 may be detected through the global monitoring unit 110. The global monitoring unit 110 may transmit the results of the detection to a corresponding work object as notification.

The communication unit 130 transmits and receives data to and from the global monitoring unit 110 and the local monitoring unit 120. The communication unit 130 may include both a wired communication module and a wireless communication module.

The first controller 140 generates information on the location of a work object and tracks a moving path of the work object based on first monitoring information. The first controller 140 may track the work object having the chances of getting into a safety accident by globally monitoring a work area. The first controller 140 may provide the prediction of a danger of an accident and warning notification by detecting and analyzing a complex dangerous situation.

The second controller 150 predicts an at-risk object that approaches within a predetermined distance of a work object, based on second monitoring information. That is, the second controller 150 may detect an accident of the at-risk object that has approached the work object, such as a collision, constriction, or an entrapment, which may occur in a danger area, and can prevent the occurrence of an industrial disaster by providing notification of a dangerous situation.

In the description of the present disclosure, a target that is monitored based on first monitoring information in a work area is denoted as a work object. A target that is monitored based on second monitoring information is denoted as an at-risk object. In some cases, a detected work object may be an at-risk object.

Furthermore, in the description of the present disclosure, the first and second controllers 140 and 150 are described as being separate components, but the present disclosure is not essentially limited thereto. In some embodiments, the first and second controllers 140 and 150 may be provided in one server in the form of independent programs.

The present disclosure may be applied to various industrial sites. Examples in which the present disclosure is applied to a manufacturing site and a construction site, among the various industrial sites, are described as follows.

First, the type of safety accident which chiefly occurs in a manufacturing site is a collision, constriction, or entrapment accident. In an embodiment of the present disclosure, risk factors to the occurrence of a safety accident in a manufacturing site may be classified into a worker's working habits, a working area in which a worker moves, a blind spot, a worker's working zone (danger area), work that requires safety regulations, and a health state of a worker.

In an embodiment of the present disclosure, the first monitoring information may be globally generated through the global monitoring unit 110, such as a camera or a LiDar sensor, and may be transmitted to the first controller 140. The first controller 140 may provide a worker or a manager with a dangerous situation that is predicted by analyzing the first monitoring information that has been globally collected through notification.

Furthermore, in an embodiment of the present disclosure, the second monitoring information may be monitored and generated through the local monitoring unit 120 that has been locally installed in a work object at work in a work site, and may be transmitted to the second controller 150. The second controller 150 may detect an at-risk object that approaches a danger area by analyzing the second monitoring information that has been locally collected, and may provide warning notification to a worker, etc. by detecting a dangerous situation.

The construction site is an environment in which large and heavy equipment is present and a work zone is frequently changed. Safety accidents that frequently occur in the construction site include a fall, collision, or entrapment accident. In an embodiment of the present disclosure, risk factors to the occurrence of a safety accident in the construction site may be classified into a worker's working habit, a working area in which a worker moves, a blind spot, a worker's working zone (danger area), and a work that requires safety regulations.

In an embodiment of the present disclosure, a work object, such as a worker, heavy equipment, or a moving structure in indoor and outdoor work areas may be tracked through the global monitoring unit 110. A dangerous situation that is predicted by analyzing the first monitoring information that has been globally collected may be provided to a worker or a manager through notification.

The system 100 for intelligent industrial safety monitoring according to an embodiment of the present disclosure may perform an AI analysis function, a DB construction function, an industrial safety management function, and a safety accident prediction function.

First, in an embodiment of the present disclosure, an object, that is, a risk factor in an industrial site, may be detected and tracked by using the AI analysis function. A behavior of a worker may be analyzed by using the AI analysis function. Through the AI analysis function, a dangerous situation for a moving object or a worker having the chances of getting into a safety accident may be predicted, and a worker or a manager may be provided with danger notification.

In an embodiment of the present disclosure, a database may be constructed for each safety accident type by collecting risk factor data which may occur in an industrial site. Through the DB construction function, a safety accident may be diagnosed by comparing and analyzing accident cases which occur in the industrial site, and a confrontational action may be analyzed and managed for each accident type.

According to an embodiment of the present disclosure, a safety accident can be predicted by constructing a 3D safety simulator for a work site in which the installation of a camera or a sensor is limited or it is difficult to obtain data or a work site in which a safety accident needs to be predicted in advance. A safety monitoring system can be constructed based on the results of simulations.

FIG. 2 is a block diagram of the system 200 for intelligent industrial safety local monitoring according to an embodiment of the present disclosure.

According to an embodiment of the present disclosure, a local monitoring function may be independently performed. The system 200 for intelligent industrial safety local monitoring for the local monitoring function may include a local monitoring unit 210, a communication unit 220, and one or more controllers 230.

The local monitoring unit 210 is attached to a work object at work within a work area of an industrial site, and generates monitoring information by monitoring the surrounding area of the work object.

The communication unit 220 transmits and receives data to and from the local monitoring unit. The controller 230 predicts an at-risk object that has approached within a predetermined distance of a work object based on monitoring information.

The system 200 for intelligent industrial safety local monitoring detects, in real time, a dangerous situation in which a collision against a person (e.g., a worker or a moving person other than a worker) or a moving object (e.g., another heavy equipment, a bicycle, or a motorcycle) occurs during a work using heavy equipment including a forklift in an industrial site, such as manufacturing, logistics, distribution, a construction, shipbuilding, or a port, and provides notification of the dangerous situation, so that a worker including a driver can take an immediate action.

For example, in the industrial site, a crash rate that occurs because a driver of heavy equipment including a forklift does not recognize an approaching person is high. Furthermore, it is essential to prevent an accident in a danger area in which a collision danger is frequent, in a situation in which only a part of the body of a worker can be seen (e.g., a sit-down work, a work behind a load, a work in a blind spot, or a work in an area close to heavy equipment that is moved with a load loaded thereon) or a situation in which it is difficult to recognize an approaching moving object or a worker at work in a blind spot.

Accordingly, in an embodiment of the present disclosure, an approaching moving object within a danger area may be detected by detecting a part of the body or a part of heavy equipment in a situation in which a part of heavy equipment including a forklift having a collision danger or a part (e.g., a face, an upper body, or a lower body that has been partially hidden) of the body including the whole body has been hidden. A danger warning area may be set for each danger area distance. Warning notification (e.g., a monitor screen, an LED bar, a sound, or a laser) may be provided.

In an embodiment of the present disclosure, a collision in a dangerous situation which cannot be detected by only the system 200 for intelligent industrial safety local monitoring can be avoided or prevented by the global monitoring unit 110 and first controller 140 of the system 100 for intelligent industrial safety monitoring in a way to generate information on the location of a work object by globally monitoring a work area and to track a moving path of the work object.

FIG. 3 is a diagram illustrating a detailed structure of a system 300 for intelligent industrial safety monitoring illustrated in FIGS. 1 and 2.

The system 300 for intelligent industrial safety monitoring according to an embodiment of the present disclosure basically includes a global monitoring system 310 and a local monitoring system 320.

The global monitoring system 310 monitors an industrial site through a global monitoring unit 311 (e.g., a camera or a LiDar) that has been globally installed, generates information on the location of a work object based on corresponding monitoring information, and tracks a moving path of the work object.

The local monitoring system 320 detects an at-risk object that approaches a danger area or a danger warning area that has been set within a work area by using a sensor (i.e., a local monitoring unit 321) attached to a work object (e.g., heavy equipment or a moving object including a forklift) at work in a specific area, and provides notification of a dangerous situation.

In an embodiment of the present disclosure, an intelligent industrial safety monitoring server 330 is connected to the global monitoring unit 311, the local monitoring unit 321, and first and second controllers 312 and 322 through a communication unit 340. The intelligent industrial safety monitoring server 330 may manage the first and second monitoring information that are collected by the global monitoring system 310 and the local monitoring system 320, respectively, and data that is predicted and analyzed based on the first and second monitoring information, and may provide a worker and a manager with separate notification through the in-depth analysis and monitoring of the data. That is, an embodiment of the present disclosure has a structure in which warning notification can be provided through the first and second controllers 312 and 322 of the global and local monitoring systems 310 and 320, respectively. Warning notification may be provided or warning notification according to the results of in-depth analysis may be provided through the intelligent industrial safety monitoring server 330, simultaneously with or separately from the provision of the warning notification by the first and second controllers 312 and 322 of the global and local monitoring systems 310 and 320. In FIG. 3, the intelligent industrial safety monitoring server 330 and the communication unit 340 have been illustrated as being included in the global monitoring system 310, but the present disclosure is not essentially limited thereto. In some embodiments, the intelligent industrial safety monitoring server 330 and the communication unit 340 may be formed as independent components that are provided at separate locations.

The global monitoring system 310 may detect a complex moving object at work in an industrial site based on the input of sensor data (i.e., the first monitoring information) from a global camera and a global LiDar that have been installed in the industrial site, may assign unique identification information to each complex moving object, and may track a moving path of the work object. Furthermore, when a collision danger is predicted by predicting a proximity distance of the work object, the first controller 312 may provide danger notification. Alternatively, information on the location of a proximity object and a moving path of the proximity object may be provided to the local monitoring system 320. Accordingly, a proximity object (i.e., an at-risk object) that has a danger of an accident with a work object at work in a specific area can be monitored.

Furthermore, in an embodiment of the present disclosure, the local monitoring system 320 monitors the surrounding area of a work object at work within a specific work area by using a camera, an acceleration sensor, a LiDar sensor, an impact sensor, or a vibration sensor (e.g., the local monitoring unit 321) that is attached to the work object, and predicts an at-risk object that approaches within a predetermined distance of the work object. That is, the local monitoring system 320 may detect a moving object (i.e., an at-risk object) that approaches a danger area or a danger warning area, and may detect a worker a part of the body of which has been hidden or a proximity moving object in an environment in which a field of vision is not secured. The local monitoring system 320 may provide the work object with the results of the prediction of a danger of an accident and warning notification based on the results of the detection. Furthermore, the local monitoring system 320 may predict a danger of an accident based on information on the location of the work object and danger prediction information including a moving path of the work object, which have been received from the global monitoring system 310, and may provide warning notification. For example, the local monitoring system 320 detects a state (e.g., tired or sleepy) of a worker and a dangerous behavior, such as speeding or bad driving habits or manipulation by using a wearable device worn by a worker, an image of the camera, and data from the acceleration sensor, and provides warning notification for a dangerous situation. Information on the dangerous situation detected as described above may be transmitted to the intelligent industrial safety monitoring server 330 through the communication unit 340 and managed by the intelligent industrial safety monitoring server 330.

Figure 4:
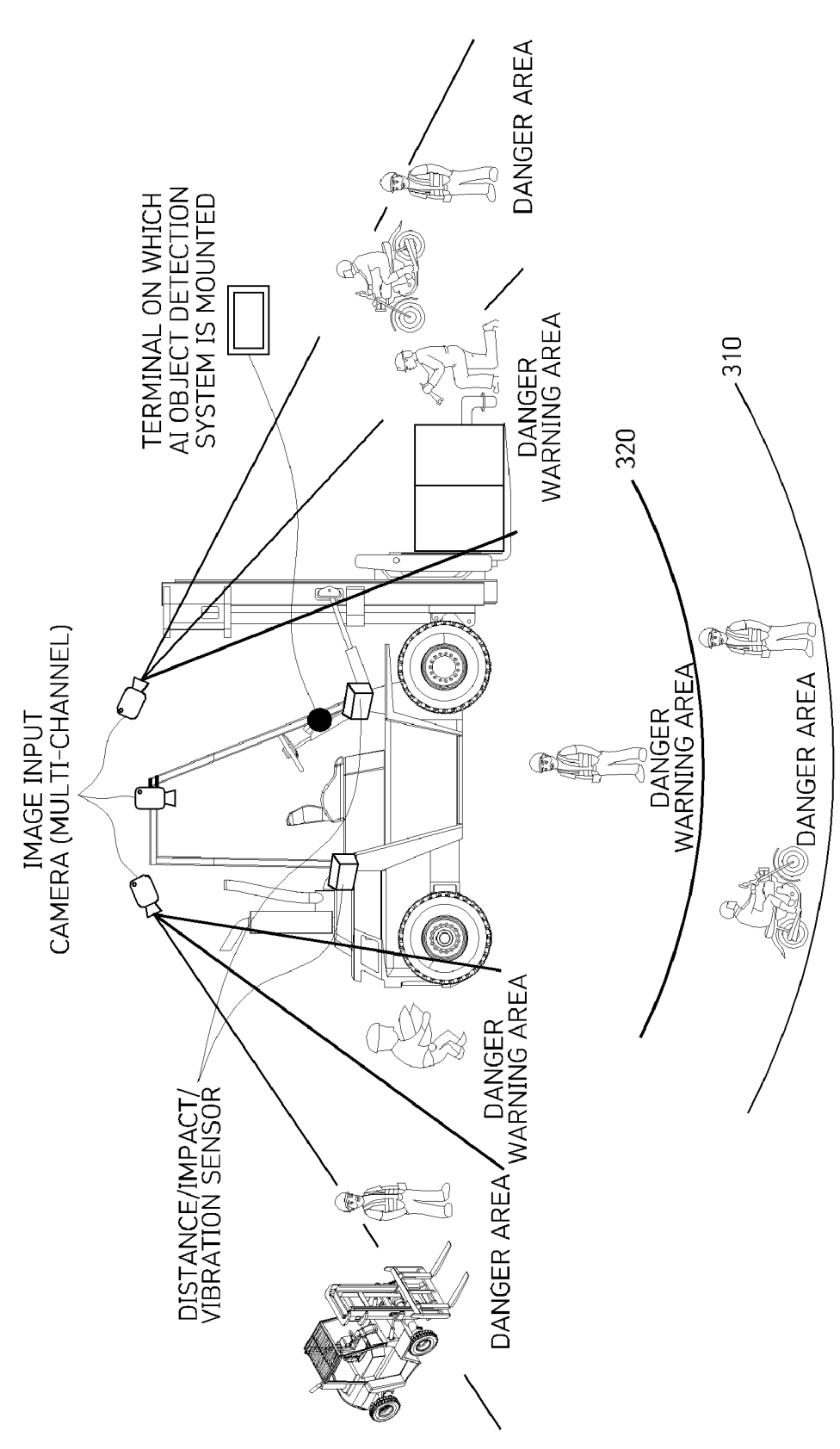
FIG. 4 is a diagram for describing a danger area and a danger warning area in an embodiment of the present disclosure.

FIG. 4 is a diagram for describing a danger area and a danger warning area in an embodiment of the present disclosure.

As an embodiment, the second controller may set a danger area 410 and a danger warning area 420 that is closer to a work object than the danger area 410, based on information on the location and moving path of an at-risk object by using the second monitoring information.

Furthermore, when an at-risk object is present within the danger warning area 420, the second controller may provide warning notification to the at-risk object or a manager.

FIG. 4 illustrates an example in which an at-risk object that approaches the danger area 410 or the danger warning area 420 is detected by performing local monitoring on an image of the at-risk object that is received through a camera (one channel to multiple channels) installed in heavy equipment including a forklift at work in an industrial site and warning notification is provided. In this case, in an embodiment of the present disclosure, the danger area 410 and the danger warning area 420 may be differently set depending on characteristics of an industrial site. An at-risk object which may become a risk factor in an industrial site is a work object or common object different from a work object on which local monitoring is performed, and may include a forklift, another piece of heavy equipment, a bicycle, a motorcycle, or a person (e.g., a worker, a staff, an outside visitor, or an object a part of the body of which has been hidden).

Figure 5:
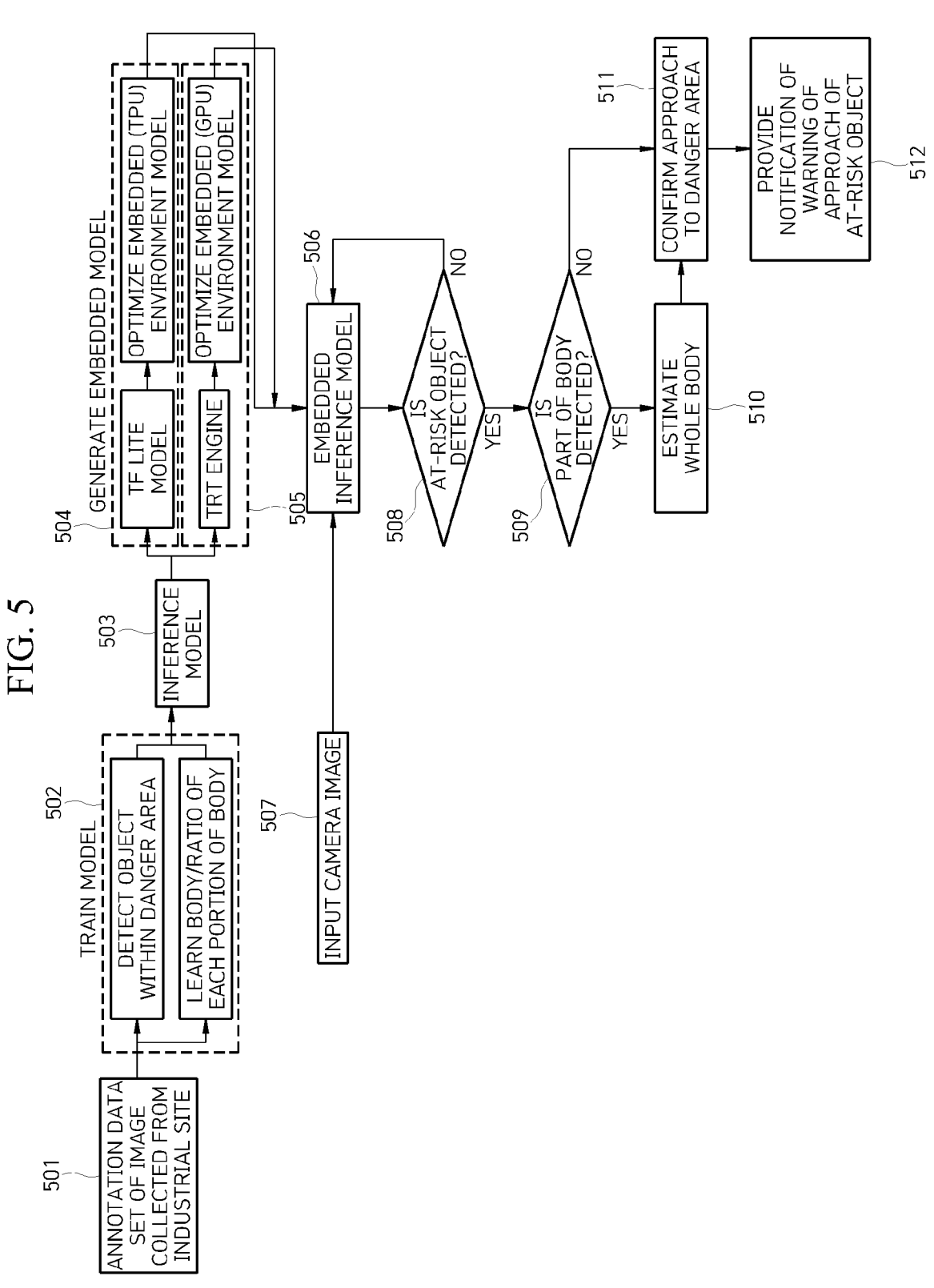
FIG. 5 is a diagram for describing a method of detecting a proximity object by considering an embedded environment in an embodiment of the present disclosure.

FIG. 5 is a diagram for describing a method of detecting a proximity object by considering an embedded environment in an embodiment of the present disclosure.

In an embodiment of the present disclosure, an inference model for detecting a moving object that approaches a danger zone may be trained and generated by the first controller, or may be trained and generated by a third controller different from the first and second controllers, that is, a separate server (not illustrated). The inference model that has been trained as described above may operate by being embedded in a work object along with the second controller. Hereinafter, an example in which the inference model is trained and generated by the first controller and then embedded in a work object along with the second controller is described.

Specifically, the first controller may set, as an input for the training of the inference model, the second monitoring information collected from an industrial site by using an annotation data set (501), and may train the inference model (502) in a way that the inference model outputs the results of the prediction of an at-risk object.

Furthermore, the first controller may generate an inference model for detecting an at-risk object (e.g., a person) that approaches a danger area by learning a ratio of each portion (e.g., a face, an upper body, or a lower body) of the body of the person detected when detecting the person having a shape of the whole body (502).

An inference model 503 that has been generated as described above may be embedded in fixed CCTV capable of monitoring or a camera attached to a work object, and may detect an at-risk object. That is, since a work object, such as heavy equipment that works while moving in an industrial site, needs to detect an at-risk object that approaches the work object while moving, the inference model may operate by being mounted on the work object in the form of an embedded-mounted terminal.

Accordingly, in an embodiment of the present disclosure, the inference model may be embedded by quantizing the inference model into an operation which may be processed even in an embedded environment and optimizing the inference model through the calibration of a value mapped to an operation and an operation provided in the embedded environment, in a high-specification GPU processing environment.

More specifically, an embodiment of the present disclosure supports the inference model so that the inference model can be driven in a GPU-based embedded environment 505 and a Tensor processing unit (TPU)-based embedded environment 504.

An inference model 506 that has been mounted on an embedded environment through quantization and optimization may receive an image of a camera installed in a work object (507), and may detect an at-risk object that approaches the work object (508).

Furthermore, in an embodiment of the present disclosure, when an at-risk object is a person and only a part of the body of the person is detected based on the second monitoring information (509), the second controller that operates the inference model may generate the results of the estimation of the whole body of the person through a predetermined whole body estimation scheme using the inference model (510), and may provide warning notification (512) if it is determined that the at-risk object approaches within a predetermined distance from a danger area based on the results of the estimation of the whole body (511). In contrast, when another work object is not a person, the second controller may confirm that the another work object approaches within the danger area, and may provide warning notification.

Figure 6:
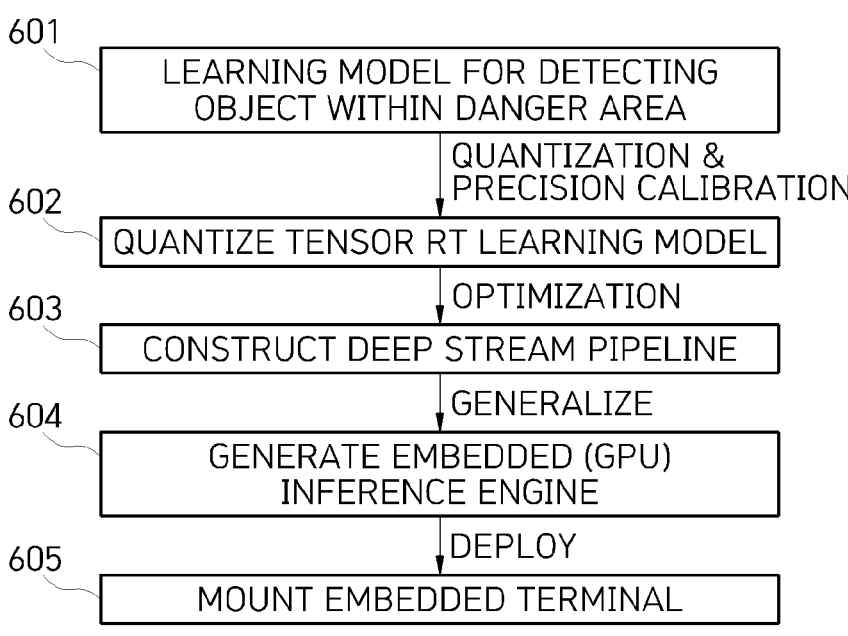
FIG. 6 is a diagram for describing an embodiment in which an inference model is mounted in a GPU-based embedded environment.

FIG. 6 is a diagram for describing an embodiment in which an inference model is mounted in the GPU-based embedded environment.

FIG. 6 illustrates a process of generating and embedding the inference model through quantization and optimization in the GPU-based embedded environment.

As an embodiment, the first controller may generate an embedded inference model by performing quantization on a weight of an inference model that has been trained to drive in the GPU-based embedded environment and a detected at-risk object.

Specifically, the first controller may train the inference model so that the inference model can detect an at-risk object that approaches a danger area based on a learning data set in which at-risk objects within the danger area have been defined as a correct answer and can generate the results of the estimation of the whole body of a person (e.g., the whole body) based on a learning data set for the person and a ratio of each body portion of the person. In this case, the first controller may previously calculate the ratio of each body portion to be used for the estimation of the whole body from the learning data set.

An inference model 601 that is generated in a PC environment minimizes an operation through a Tensor RT engine so that the inference model can drive in a Tensor processing unit (TPU)-based embedded environment, and performs quantization on a learnt weight and a detected object. In an embodiment of the present disclosure, a quantization scheme that minimizes the deterioration of detection performance has been selected and applied (602). The inference model which may be driven in an embedded environment may be generated (604) by adjusting values that have not been mapped through calibration and performing a generalization process so that an input image can be processed through a deep stream pipeline (603).

The generated inference model is embedded and mounted on a work object (605). Thereafter, the inference model may detect an at-risk object that approaches a work object in real time. When a detected at-risk object is not present, the inference model may perform the object detection process again. Furthermore, when a detected at-risk object approaches a danger area, the inference model may provide warning notification. In this case, when the detected at-risk object is a part of the body of a person, the inference model may estimate the whole body of the person by applying a whole body estimation ratio of the person, and may provide warning notification.

Figure 7:
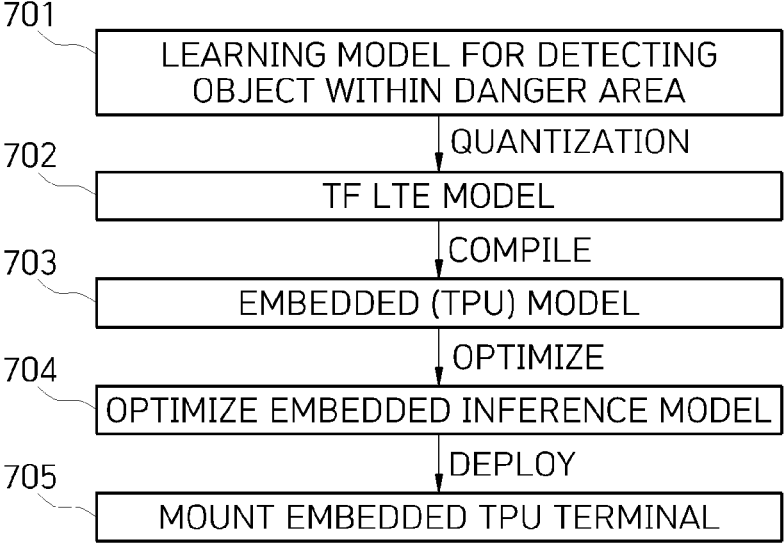
FIG. 7 is a diagram for describing an embodiment in which an inference model is mounted in a Tensor processing unit (TPU)-based embedded environment.

FIG. 7 is a diagram for describing an embodiment in which an inference model is mounted in a TPU-based embedded environment.

FIG. 7 illustrates a process of generating and embedding an inference model through quantization and optimization in the TPU-based embedded environment.

As an embodiment, the first controller may generate an embedded inference model by performing quantization so that the inference model corresponds to an operation that is provided in the TPU-based embedded environment, and may perform optimization so that an operation function limited in an embedded environment operates in the TPU-based embedded environment.

Specifically, the first controller may generate an inference model optimized for an embedded environment (TPU) (703) by performing quantization (32-bit float 8-bit int.) (702) on an inference model 701 generated in a PC environment suitably for an operation that is provided in the TPU-based embedded environment. Furthermore, in order to maintain detection performance of an at-risk object within a danger area, the first controller may implement an operation function (e.g., LeakyRelu, Sigmoid, or Bounding Box) limited in the embedded environment (TPU), and may optimize an operation that operates in a CPU (704) so that the operation can operate even in a TPU.

The generated inference model is embedded and mounted on a work object (705). Thereafter, the inference model may detect an at-risk object that approaches a work object in real time. When a detected at-risk object is not present, the inference model may perform the object detection process again. Furthermore, when a detected at-risk object approaches a danger area, the inference model may provide warning notification. In this case, when the detected at-risk object is a part of the body of a person, the inference model may estimate the whole body of the person by applying a whole body estimation ratio of the person, and may provide warning notification.

Figure 8:
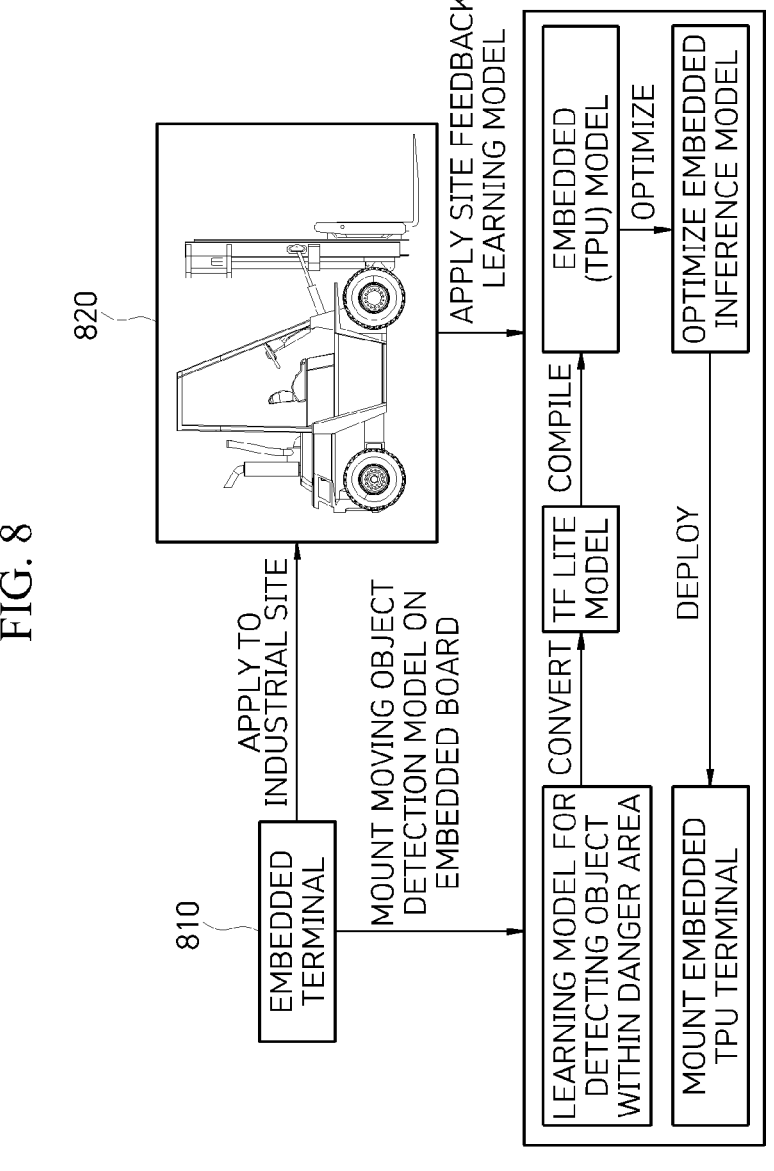
FIG. 8 is a diagram for describing contents in which an inference model is mounted in the form of an embedded terminal in an embodiment of the present disclosure.

FIG. 8 is a diagram for describing contents in which an inference model is mounted in the form of an embedded terminal in an embodiment of the present disclosure.

As an embodiment, the inference model may be mounted (810) in the form of an embedded terminal. The embedded terminal may be installed in a work object at work in a work area of an industrial site so that the system for intelligent industrial safety monitoring can perform local monitoring.

The inference model that has been embedded as described above may operate by being attached to a work object in the form of an embedded terminal. The inference model for detecting and predicting a dangerous situation can be improved through a demonstration operation 820 in an industrial site.

Figure 9:
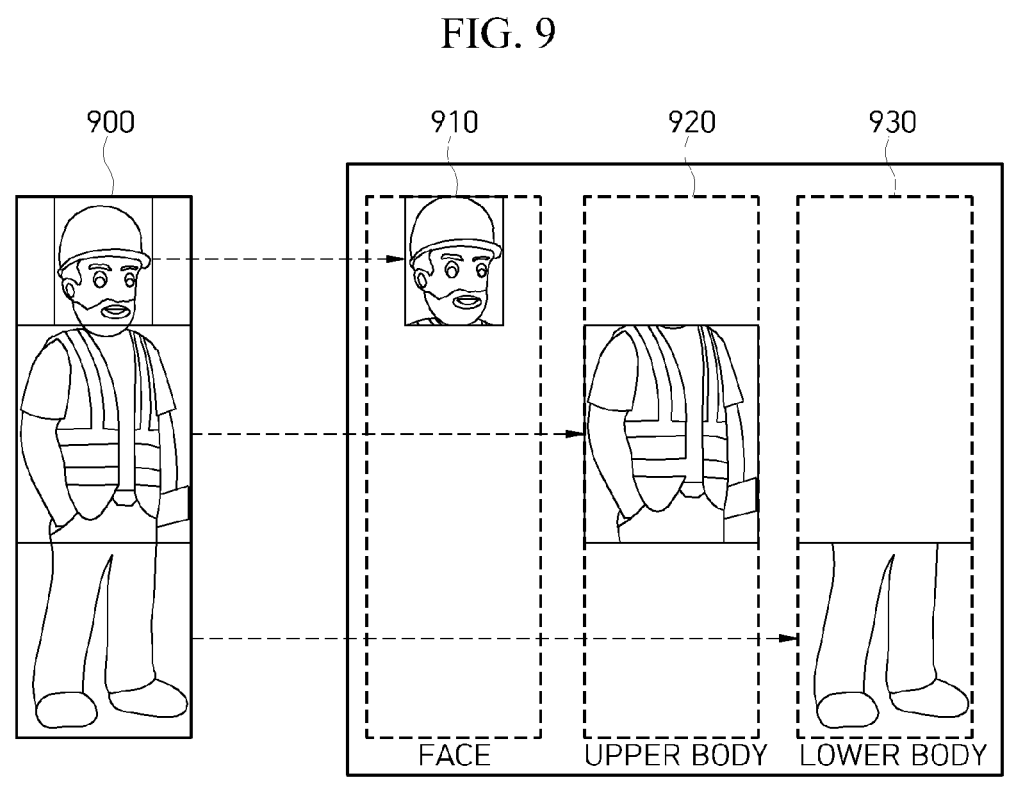
Figures 10, 11:
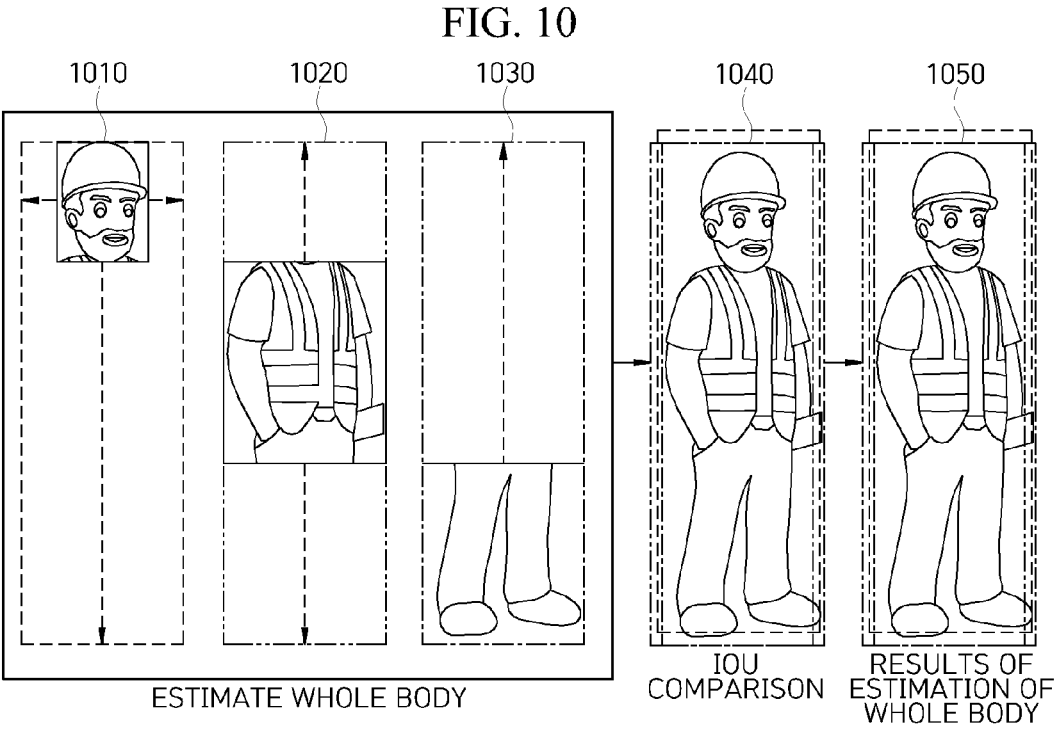
FIG. 10 is a diagram illustrating the results of the estimation of the whole body of an at-risk object a part of the body of which has been hidden.
FIG. 11 is a diagram illustrating a construction of a first and second controller in an embodiment of the present disclosure.

FIG. 9 is a diagram for describing contents in which a whole body estimation ratio is learnt in an embodiment of the present disclosure. FIG. 10 is a diagram illustrating the results of the estimation of the whole body of an at-risk object a part of the body of which has been hidden.

The system for intelligent industrial safety monitoring according to an embodiment of the present disclosure may monitor a dangerous situation in various industrial sites, may detect a dangerous situation, and may notify a driver or a worker of a predicted dangerous situation. In this case, in the industrial site, an at-risk object may be frequently hidden within a danger area or only a part of the at-risk object may be identified due to a complicated work environment and various types of facilities and loads. A safety accident frequently occurs because the at-risk object is not recognized in a work object. However, the existing safety monitoring system cannot detect an at-risk object if a part of the at-risk object is hidden, and cannot also detect a person if a part of the person is hidden.

In particular, if a person sits at work in a work environment in which a part of the body of the person is hidden or the person is rarely seen due to a load, when the person suddenly moves, it is necessary to detect the person and to provide notification of a dangerous situation in a blind spot or a situation in which the sudden movement of the person is not recognized due to a driver's carelessness.

In order to solve such a problem, in an embodiment of the present disclosure, when the whole body of a person is detected in an image annotation data set collected in various industrial sites (900), a whole body estimation ratio of the person may be calculated through a process of learning a ratio of each body part (910 to 930).

When the learning of a ratio for the estimation of the whole body is completed in a learning model, an embedded inference model detects an at-risk object based on the second monitoring information that is input from the camera in real time. In this case, when the at-risk object is a person, the embedded inference model identifies whether a part of the body of the person has been detected. Furthermore, when the part of the body is detected, the embedded inference model may estimate the whole body of the person based on a whole body estimation ratio of the person.

In this case, if the results of the estimation of the whole body estimated as only a part of the body are generated (1010 to 1030) and a calculated value of an intersection of union (IOU) is a given threshold value or more (1040), the second controller may remove each box area that has been set in corresponding results of the estimation of the whole body (1050). In this case, the second controller may remove the remaining box areas except a box area having the highest detection ratio in an overlapped bounding box area through a non-maximum suppression (NMS) process.

The second controller provides warning notification by determining whether an object for which the estimation of the whole body has been completed approaches a danger area.

FIG. 11 is a diagram illustrating a construction of a first/second controller 1100 in an embodiment of the present disclosure.

The first/second controller 1100 according to an embodiment of the present disclosure includes an input unit 1110, a communication unit 1120, a display unit 1130, memory 1140, and a processor 1150.

The input unit 1110 generates input data in response to a user input to the system 100 for intelligent industrial safety monitoring. The user input may include a user input relating to data to be processed by the system 100 for intelligent industrial safety monitoring. For example, the data may include data for checking the first and second monitoring information and data for checking warning notification.

The input unit 1110 includes at least one input means. The input unit 1110 may include a keyboard, a key pad, a dome switch, a touch panel, a touch key, a mouse, and a menu button.

The communication unit 1120 transmits and receives data between the internal components or performs communication with an external device, such as an external server. That is, the communication unit 1120 may transmit and receive data between the first and second controllers, and may transmit and receive the first and second monitoring information. The communication unit 1120 may include both a wired communication module and a wireless communication module. The wired communication module may be implemented by using a power line communication device, a telephone line communication device, cable home (MoCA), Ethernet, IEEE1294, an integrated wired home network, or an RS-485 controller. Furthermore, the wireless communication module may be constituted with a module for implementing a function, such as a wireless LAN (WLAN), Bluetooth, a HDR WPAN, UWB, RoLa, ZigBee, Impulse Radio, 60 GHz WPAN, Binary-CDMA, a wireless USB technology, a wireless HDMI technology, $5^{th}$ generation (5G) communication, long term evolution-advanced (LTE-A), long term evolution (LTE), or wireless fidelity (Wi-Fi).

The display unit 1130 displays display data according to an operation of the system 100 for intelligent industrial safety monitoring. For example, the display unit 1130 may display, as display data, the first and second monitoring information, the warning notification, or information indicating whether an at-risk object is present.

The display unit 1130 includes a liquid crystal display (LCD), a light emitting diode (LED) display, an organic LED (OLED) display, a micro electro mechanical systems (MEMS) display, and an electronic paper display. The display unit 1130 may be implemented as a touch screen by being coupled with the input unit 1110.

The memory 1140 distinguishes between a work object and an at-risk object based on the first and second monitoring information, determines a dangerous situation, and stores programs for providing warning notification. In this case, the memory 1140 collectively refers to nonvolatile storage and volatile storage that continue to retain information stored therein although power is not supplied thereto. For example, the memory 1140 may include NAND flash memory, such as a compact flash (CF) card, a secure digital (SD) card, a memory stick, a solid-state drive (SSD), and a micro SD card, magnetic computer storage, such as a hard disk drive (HDD), and optical disc drives, such as CD-ROM and DVD-ROM.

The processor 1150 may control at least another component (e.g., a hardware or software component) of the system for intelligent industrial safety monitoring by executing software, such as a program, and may perform various data processing or operations.

Hereinafter, a method performed by the system for intelligent industrial safety monitoring according to an embodiment of the present disclosure is described with reference to FIG. 12.

Figure 12:
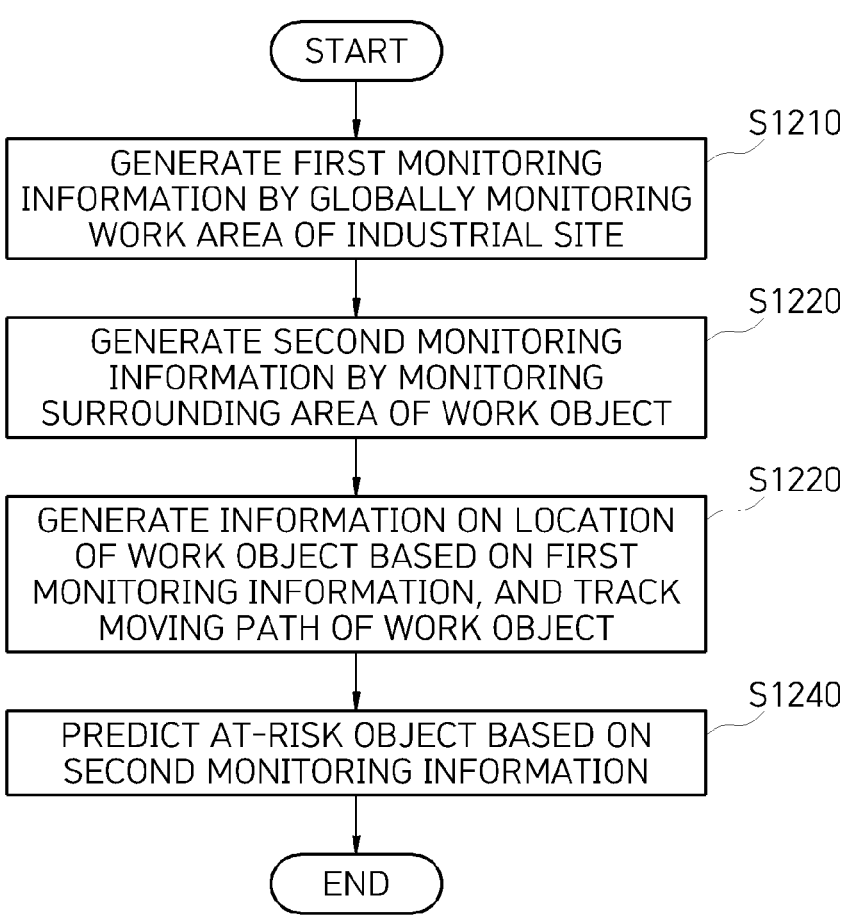
FIG. 12 is a flowchart of a method for intelligent industrial safety monitoring according to an embodiment of the present disclosure.

FIG. 12 is a flowchart of a method for intelligent industrial safety monitoring according to an embodiment of the present disclosure.

First, the system for intelligent industrial safety monitoring generates first monitoring information by globally monitoring a work area of an industrial site (S1210).

Next, the system for intelligent industrial safety monitoring is attached to a work object at work within the work area, and generates second monitoring information by monitoring the surrounding area of the work object (S1220).

Next, the system for intelligent industrial safety monitoring generates information on the location of the work object based on the first monitoring information, and tracks a moving path of the work object (S1230).

Next, the system for intelligent industrial safety monitoring predicts an at-risk object that has approached within a predetermined distance of the work object based on the second monitoring information (S1240).

In the aforementioned description, steps S1210 to S1240 may be further divided into additional steps or may be combined into smaller steps depending on an implementation example of the present disclosure. Furthermore, some steps may be omitted, if necessary, and the sequence of steps may be changed. Furthermore, although contents are omitted, the contents described with reference to FIGS. 1 to 11 and the contents described with reference to FIG. 12 may be mutually applied.

The method for intelligent industrial safety monitoring according to an embodiment of the present disclosure may be implemented in the form of a program (or application) in order to be executed by being combined with a computer, that is, hardware, and may be stored in a medium.

The aforementioned program may include a code coded in a computer language, such as Python, C, C++, JAVA, Ruby, or a machine language which is readable by a processor (CPU) of a computer through a device interface of the computer in order for the computer to read the program and execute the methods implemented as the program. Such a code may include a functional code related to a function, etc. that defines functions necessary to execute the methods, and may include an execution procedure-related control code necessary for the processor of the computer to execute the functions according to a given procedure. Furthermore, such a code may further include a memory reference-related code indicating at which location (address number) of the memory inside or outside the computer additional information or media necessary for the processor of the computer to execute the functions needs to be referred. Furthermore, if the processor of the computer requires communication with any other remote computer or server in order to execute the functions, the code may further include a communication-related code indicating how the processor communicates with the any other remote computer or server by using a communication module of the computer and which information or media needs to be transmitted and received upon communication.

The stored medium means a medium, which semi-permanently stores data and is readable by a device, not a medium storing data for a short moment like a register, cache, or a memory. Specifically, examples of the stored medium include ROM, RAM, CD-ROM, a magnetic tape, a floppy disk, optical data storage, etc., but the present disclosure is not limited thereto. That is, the program may be stored in various recording media in various servers which may be accessed by a computer or various recording media in a computer of a user. Furthermore, the medium may be distributed to computer systems connected over a network, and a code readable by a computer in a distributed way may be stored in the medium.

The description of the present disclosure is illustrative, and a person having ordinary knowledge in the art to which the present disclosure pertains will understand that the present disclosure may be easily modified in other detailed forms without changing the technical spirit or essential characteristic of the present disclosure. Accordingly, it should be construed that the aforementioned embodiments are only illustrative in all aspects, and are not limitative. For example, elements described in the singular form may be carried out in a distributed form. Likewise, elements described in a distributed form may also be carried out in a combined form.

The scope of the present disclosure is defined by the appended claims rather than by the detailed description, and all changes or modifications derived from the meanings and scope of the claims and equivalents thereto should be interpreted as being included in the scope of the present disclosure.

What is claimed is:

1. A system for intelligent industrial safety monitoring, comprising:

a global monitoring unit configured to generate first monitoring information by globally monitoring a work area of an industrial site;

a local monitoring unit attached to a work object at work within the work area and configured to generate second monitoring information by monitoring a surrounding area of the work object;

a communication unit configured to transmit and receive data to and from the global monitoring unit and the local monitoring unit; and a first controller configured to generate information on a location of the work object based on the first monitoring information and track a moving path of the work object, and at least one second controller configured to predict an at-risk object that has approached within a predetermined distance of the work object based on the second monitoring information;

wherein the first controller sets the second monitoring information as an input for training of an inference model by annotating the second monitoring information, and trains the inference model so that results of the prediction of the at-risk object are output;

wherein when the at-risk object is a person and only a part of a body of the person is detected based on the second monitoring information, the second controller generates results of an estimation of a whole body of the person based on a predetermined whole body estimation scheme through the inference model, and provides a warning notification perceptible to at least one of a worker of the industrial site or the person when the at-risk object is the person when determining that the person approaches within the predetermined distance from the danger area based on the results of the estimation of the whole body.

2. The system of claim 1, wherein the second controller sets a danger area and a danger warning area closer to the work object than the danger area based on information on a location and moving path of the at-risk object, based on the second monitoring information, and provides the at-risk object or a manager with the warning notification when the at-risk object is present within the danger warning area.

3. The system of claim 1, wherein when a calculated value of an intersection of union (IOU) is a predetermined threshold value or more after the results of the estimation of the whole body estimated as only a part of the body are generated, the second controller removes each box area set in corresponding results of the estimation of the whole body, and removes, through a non-maximum suppression (NMS) process, remaining box areas except a box area that has a highest detection rate in an overlapped bounding box area.

4. The system of claim 1, wherein the first controller generates an embedded inference model by performing quantization on the inference model based on a weight of the inference model trained to drive in a GPU-based embedded environment and the detected at-risk object.

5. The system of claim 1, wherein the first controller generates an embedded inference model by performing quantization on the inference model in a way to correspond to an operation provided in a TPU-based embedded environment, and performs optimization on the inference model so that an operation function limited in the embedded environment operates in the TPU-based embedded environment.

6. A system for intelligent industrial safety local monitoring, comprising:

a local monitoring unit attached to a work object at work within a work area of an industrial site and configured to generate monitoring information by monitoring a surrounding area of the work object;

a communication unit configured to transmit and receive data to and from the local monitoring unit; and at least one controller configured to predict an at-risk object that has approached within a predetermined distance of the work object based on the monitoring information;

wherein the at least one controller sets the monitoring information as an input for training of an inference model by annotating the monitoring information, and trains the inference model so that results of the prediction of the at-risk object are output;

wherein when the at-risk object is a person and only a part of a body of the person is detected based on the monitoring information, the at least one controller generates results of an estimation of a whole body of the person based on a predetermined whole body estimation scheme through the inference model, and provides a warning notification perceptible to at least one of a worker of the industrial site or the person when the at-risk object is the person when determining that the person approaches within the predetermined distance from the danger area based on the results of the estimation of the whole body.

7. A method performed by a system for intelligent industrial safety monitoring, the method comprising:

generating first monitoring information by globally monitoring a work area of an industrial site;

being attached to a work object at work within the work area and generating second monitoring information by monitoring a surrounding area of the work object;

generating information on a location of the work object based on the first monitoring information and tracking a moving path of the work object;

predicting an at-risk object that has approached within a predetermined distance of the work object based on the second monitoring information; and setting the second monitoring information as an input for a training of an inference model by annotating the second monitoring information and training the inference model so that results of the prediction of the at-risk object are output;

when the at-risk object is a person and only a part of a body of the person is detected based on the second monitoring information, generating results of an estimation of a whole body of the person based on a predetermined whole body estimation scheme through the inference model; and providing a warning notification when determining that the person is present within the danger warning area based on the results of the estimation of the whole body.

8. The method of claim 7, further comprising:

setting a danger area and a danger warning area closer to the work object than the danger area based on information on a location and moving path of the at-risk object, based on the second monitoring information; and providing the at-risk object or a manager with the warning notification when the at-risk object is present within the danger warning area.

9. The method of claim 7, wherein the generating of the results of the estimation of the whole body of the person based on the predetermined whole body estimation scheme through the inference model comprises:

when a calculated value of an intersection of union (IOU) is a predetermined threshold value or more after the results of the estimation of the whole body estimated as only a part of the body are generated, removing each box area set in corresponding first results of the estimation of the whole body; and removing, through a non-maximum suppression (NMS) process, remaining box areas except a box area that has a highest detection rate in an overlapped bounding box area.

* * * * *